US010401862B2

United States Patent
Russell et al.

(10) Patent No.: US 10,401,862 B2
(45) Date of Patent: Sep. 3, 2019

(54) SEMANTIC OBJECT CLUSTERING FOR AUTONOMOUS VEHICLE DECISION MAKING

(71) Applicant: Waymo LLC, Mountain View, CA (US)

(72) Inventors: Jared Stephen Russell, San Francisco, CA (US); Fang Da, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 15/798,926

(22) Filed: Oct. 31, 2017

(65) Prior Publication Data

US 2019/0129432 A1 May 2, 2019

(51) Int. Cl.
G05D 1/02 (2006.01)
G05D 1/00 (2006.01)

(52) U.S. Cl.
CPC .......... G05D 1/0214 (2013.01); G05D 1/0088 (2013.01); *G05D 2201/0213* (2013.01)

(58) Field of Classification Search
CPC .............. G05D 1/0214; G05D 1/0088; G05D 2201/0213
USPC .......................................................... 701/23
See application file for complete search history.

(56) References Cited

U.S. PATENT DOCUMENTS

| 7,880,621 | B2 | 2/2011 | Kalik |
| 9,110,163 | B2 | 8/2015 | Rogan |
| 9,315,192 | B1 | 4/2016 | Zhu et al. |
| 9,335,178 | B2 | 5/2016 | Nickolaou |
| 9,489,601 | B2 | 11/2016 | Fairfield et al. |
| 9,566,986 | B1 | 2/2017 | Gordon et al. |
| 9,576,185 | B1 | 2/2017 | Delp |
| 9,600,768 | B1 | 3/2017 | Ferguson |
| 2007/0244627 | A1 | 10/2007 | Boss et al. |
| 2010/0106356 | A1 | 4/2010 | Trepagnier et al. |
| 2012/0116662 | A1 | 5/2012 | Zeng et al. |
| 2013/0016877 | A1 | 1/2013 | Feris et al. |
| 2014/0003708 | A1 | 1/2014 | Datta et al. |
| 2014/0029852 | A1 | 1/2014 | Pisipati et al. |

(Continued)

FOREIGN PATENT DOCUMENTS

EP 2338029 B1 5/2017
WO WO2012150591 A2 11/2012

OTHER PUBLICATIONS

International Search Report and Written Opinion for Application No. PCT/US2018/057992 dated Feb. 20, 2019.

(Continued)

*Primary Examiner* — Krishnan Ramesh
(74) *Attorney, Agent, or Firm* — Botos Churchill IP Law (57) ABSTRACT

The technology relates to controlling a vehicle in an autonomous driving mode. For example, sensor data identifying a plurality of objects may be received. Pairs of objects of the plurality of objects may be identified. For each identified pair of objects of the plurality of objects, a similarity value which indicates whether the objects of that identified pair of objects can be responded to by the vehicle as a group may be determined. The objects of one of the identified pairs of objects may be clustered together based on the similarity score. The vehicle may be controlled in the autonomous mode by responding to each object in the cluster in a same way.

20 Claims, 10 Drawing Sheets

(56) References Cited

U.S. PATENT DOCUMENTS

| | | |
|---|---|---|
| 2015/0254986 A1 | 9/2015 | Fairfield et al. |
| 2016/0046290 A1 | 2/2016 | Aharony et al. |
| 2016/0132705 A1 | 5/2016 | Kovarik et al. |
| 2017/0043768 A1 | 2/2017 | Prokhorov |
| 2017/0045885 A1 | 2/2017 | Okumura et al. |
| 2017/0151943 A1 | 6/2017 | Goto |
| 2017/0212518 A1* | 7/2017 | Iimura ................. G05D 1/0214 |

OTHER PUBLICATIONS

International Search Report and Written Opinion for Application No. PCT/US2018/057971 dated Feb. 25, 2019.

\* cited by examiner

SEMANTIC OBJECT CLUSTERING FOR AUTONOMOUS VEHICLE DECISION MAKING

CROSS-REFERENCE TO RELATED APPLICATION

The present application is related to co-pending application Ser. No. 15/798,881, entitled Detecting And Responding To Traffic Redirection For Autonomous Vehicles, which is filed concurrently herewith, and the entire disclosure of which is incorporated by reference herein.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

In order to provide a safe and comfortable trajectory for a self-driving vehicle that operates in an autonomous driving mode or driverless vehicle, it is necessary to determine an appropriate type of reaction to any objects or agents such as other vehicles, bicyclists, pedestrians, etc., in the environment of the vehicle. Typically, there are a finite number of reactions to a given object, such as passing to the left of the object, passing to the right, stopping in front of the object, remaining behind of the object, etc. However, when there are multiple objects, the number of possible reactions can grow exponentially.

For humans, a simple solution to this problem is to "group" certain objects together and respond to those objects as if a singular entity. Humans use multiple cues when deciding to react to the group, based on proximity, object type, relative motion, etc. In addition, humans may recognize that groups of objects sometimes carry semantics that are not necessarily obvious when looking at any given object in isolation. For example, a group of small children accompanied by one or more adults may motivate a different reaction than a single child with an adult, and a line of slow-moving vehicles with flashing lights may be a funeral procession.

BRIEF SUMMARY

One aspect of the disclosure provides a method of controlling a vehicle in an autonomous driving mode. The method includes receiving, by one or more processors, sensor data identifying a plurality of objects; identifying pairs of objects of the plurality of objects; determining, by the one or more processors, for each identified pair of objects of the plurality of objects, a similarity value which indicates whether the objects of that identified pair of objects can be responded to by the vehicle a group; clustering, by the one or more processors, the objects of one of the identified pairs of objects based on the similarity score; and controlling, by the one or more processors, the vehicle in the autonomous driving mode by responding to each object in the cluster in a same way.

In one example, the clustering is further based on a distance between the objects of the one of the identified pairs of objects. In another example, the clustering is further based on a similarity between object types of the objects of the one of the identified pairs of objects. In another example, the clustering is further based on a similarity between past and current motion of the objects of the one of the identified pairs of objects. In another example, the similarity values are determined further based on a similarity between predicted future motion of the objects of the one of the identified pairs of objects. In another example, the clustering is further based on a relative location of the objects of the one of the identified pairs of objects to a feature in the environment. In this example, the feature is a crosswalk. Alternatively, the feature is a bicycle lane. In another example, the clustering is further based on whether one object of each identified pair of objects appears to be following another object of that identified pair of objects. In another example, the clustering is further based on whether the objects of each identified pair of objects are identified as belonging to a predetermined semantic group.

Another aspect of the disclosure provides a system for controlling a vehicle in an autonomous driving mode. The system includes one or more processors configured to receive sensor data identifying a plurality of objects; identify pairs of objects of the plurality of objects; determine, for each identified pair of objects of the plurality of objects, a similarity value which indicates whether the objects of that identified pair of objects can be responded to by the vehicle as a group; cluster the objects of one of the identified pairs of objects based on the similarity score; and control the vehicle in the autonomous driving mode by responding to each object in the cluster in a same way.

In one example, the one or more processors are further configured to cluster the objects of the one of the identified pairs of objects further based on a distance between the objects of the one of the identified pairs of objects. In another example, the one or more processors are further configured to cluster the objects of the one of the identified pairs of objects based on a similarity between object types of the objects of the one of the identified pairs of objects. In another example, the one or more processors are further configured to cluster the objects of the one of the identified pair of objects further based on a similarity between past and current motion of the objects of each identified pair of objects. In another example, the one or more processors are further configured to cluster the objects of the one of the identified pair of objects further based on a similarity between predicted future motion of the objects of the one of the identified pairs of objects. In another example, the one or more processors are further configured to cluster the objects of the one of the identified pair of objects further based on a relative location of the objects of the one of the identified pairs of objects to a feature in the environment. In this example, the feature is a crosswalk. Alternatively, the one or more processors are further configured to cluster the objects of the one of the identified pair of objects further based on whether one object of the objects of the one of the identified pairs of objects appears to be following another object of the objects of the one of the identified pairs of objects. In another example, the one or more processors are further configured to cluster the objects of the one of the identified pair of objects further based on whether the objects of the one of the identified pair of objects are identified as belonging to a predetermined semantic group. In another example, the system also includes the vehicle.

DETAILED DESCRIPTION

Overview

Autonomous vehicles may also benefit from grouping objects together. This would allow the vehicle's computing devices to make decisions for an entire group of objects rather than for each individually. This, in turn, may save a significant amount of processing power while at the same time allowing the vehicle to respond to a multitude of different situations safely and effectively and also provides a mechanism to ensure that the vehicle does not choose a plan that is kinematically feasible and obeys rules of the road, but discourteous due to context. However, autonomous vehicles do not have the functional capabilities to recognize appropriate groups or clusters of objects in the way that humans do. Therefore in order to cluster objects together the vehicle's computing devices must make estimations about the similarity of objects and determine which objects can be logically clustered together.

Accordingly, given a set of detected objects in the world, measurements of their current locations and states of motion, and a temporal history of their movement, the vehicle's computing devices define a similarity measure or score between pairs of objects. This similarity measure may consider a plurality of different factors. Each factor may increase or decrease a similarity measure between two objects.

When a similarity measure meets a predetermined threshold, the objects may be clustered together. The thresholds may be based on the precision and recall of the semantic clustering. A high recall or lower threshold value may be chosen initially to do clustering. However, if there are other computing resources available, higher precision or higher threshold values may also be explored.

A union-find algorithm may be used to achieve the clustering. This can help to enforce that the vehicle's reaction for each object in a cluster is the same. In other words, the vehicle's computing devices may determine how to maneuver through the environment by presupposing that the clustered objects are a single object.

The clustering can be re-evaluated each time there is a new observation of the objects. In this regard, objects can be clustered and severed from one another quickly. However, to allow for consistent vehicle behaviors and simplify the processing of the situation, when selecting between two reactions where it is not clear which is better, a prior determination based on whether the object was clustered with another object can be used to select between the reactions.

In addition to cutting down the required number of reactions to evaluate and thereby cutting down on unnecessary computation, this approach offer additional benefits.

For instance, the approach provides a framework for reacting to semantic classes of object clusters such as accompanied children, funeral processions, etc. The approach also provides a tool for addressing object segmentation issues coming from an onboard perception system. Segmentation, or differentiating between two perceived objects, is seldom perfect because perception engineers generally must tune between under segmentation (sometimes thinking that two distinct but nearby objects are the same) and over segmentation (thinking that one object is instead two distinct nearby objects). In the latter case, these objects to end up in the same semantic cluster and the vehicle's computing devices would generate the same trajectory as if segmentation were in fact perfect.

Example Systems

Figure 1:
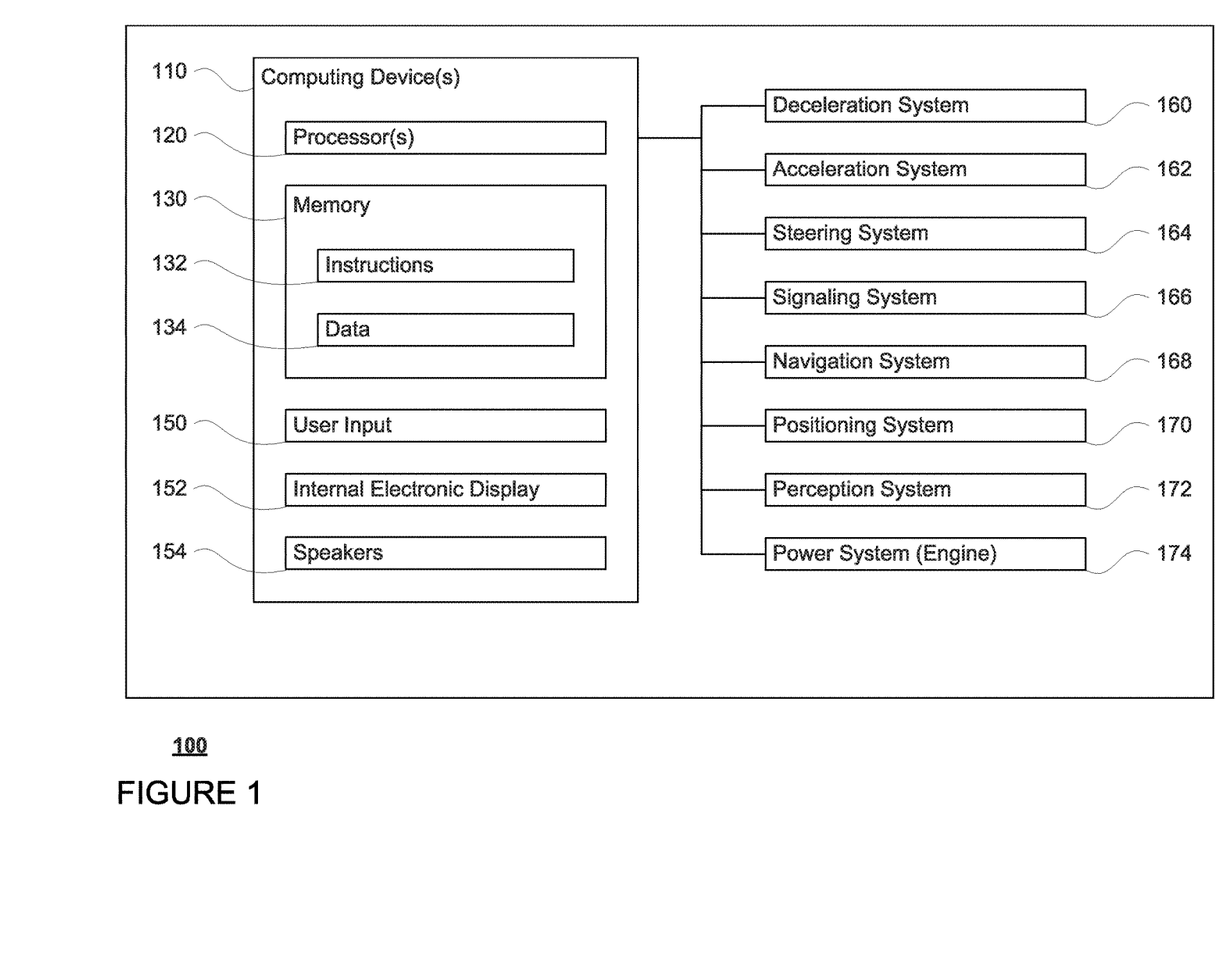
FIG. 1 is a functional diagram of an example vehicle in accordance with aspects of the disclosure.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing devices code on the computing device-readable medium. In that regard, the terms "instructions" and "programs" may be used interchangeably herein. The instructions may be stored in object code format for direct processing by the processor, or in any other computing devices language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing devices having its own processor or central processing unit (CPU), memory, etc. which may interface with the computing devices 110 via a high-bandwidth or other network connection. In some examples, the computing devices may be a user interface computing devices which can communicate with a user's client device. Similarly, the memory may be a hard drive or other storage media located in a housing different from that of computing devices 110. Accordingly, references to a processor or computing devices will be understood to include references to a collection of processors or computing devices or memories that may or may not operate in parallel.

Computing devices 110 may all of the components normally used in connection with a computing devices such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing devices 110 may be an autonomous driving computing system incorporated into vehicle 100. The autonomous driving computing system may capable of communicating with various components of the vehicle. For example, returning to FIG. 1, computing devices 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in an external environment of the vehicle), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing devices 110, in actuality, these systems may also be incorporated into computing devices 110, again as an autonomous driving computing system for controlling vehicle 100.

The computing devices 110 may control the direction and speed of the vehicle by controlling various components. By way of example, computing devices 110 may navigate the vehicle to a destination location completely autonomously using data from the map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Figure 2:
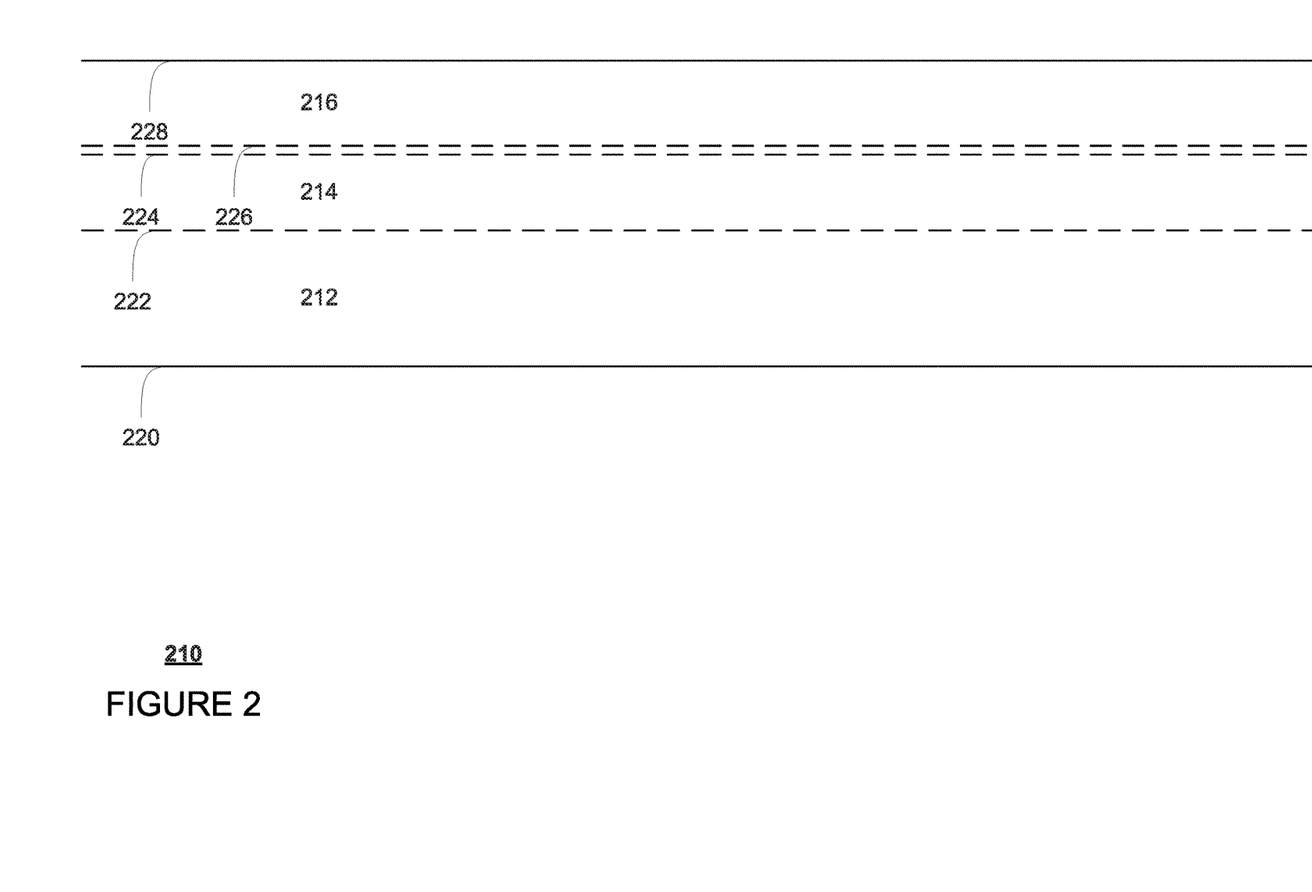
FIG. 2 is an example representation of detailed map information in accordance with aspects of the disclosure.
Figure 3A:
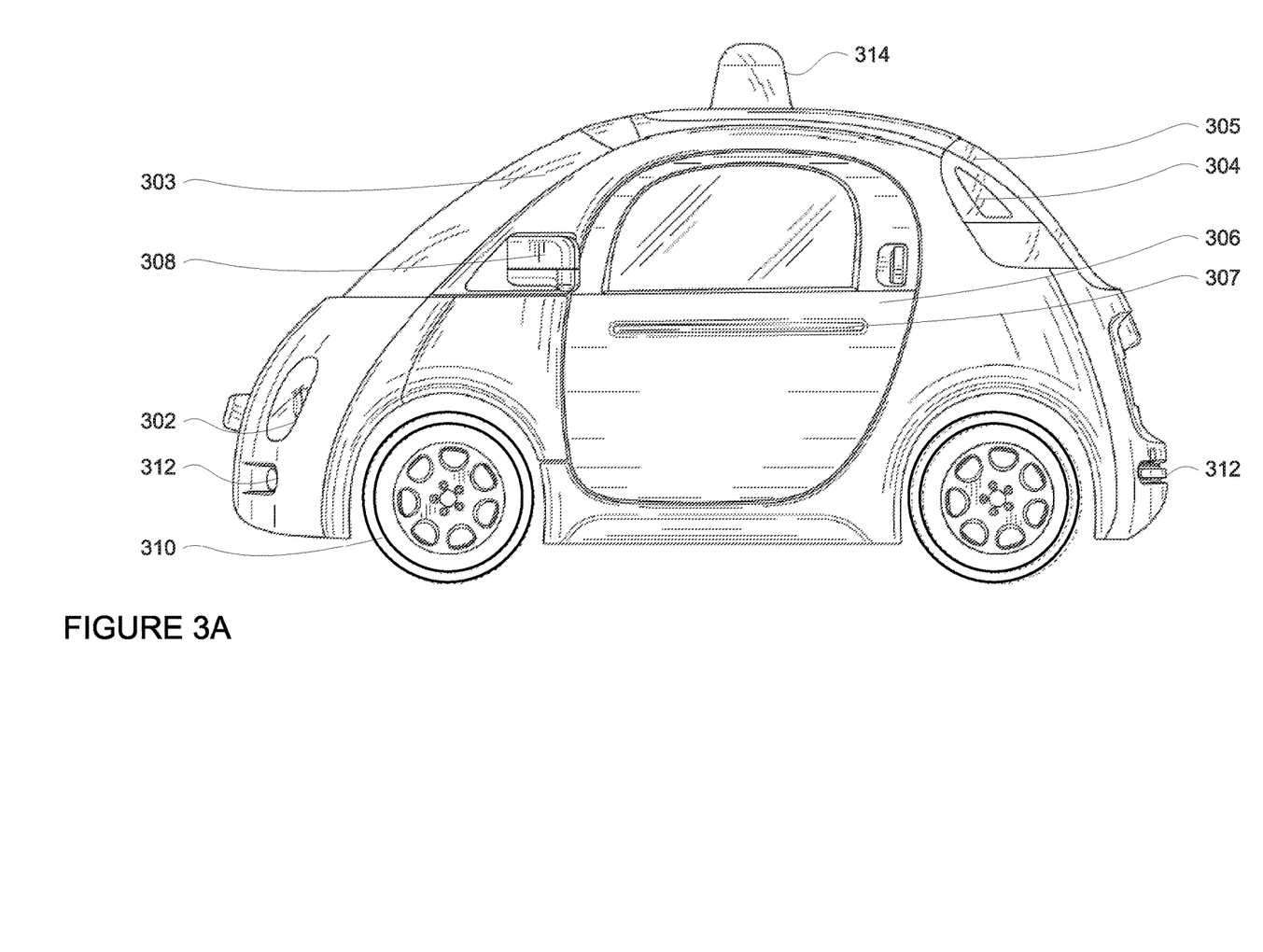
FIGS. 3A-3D are example external views of a vehicle in accordance with aspects of the disclosure.
Figures 3B, 3C:
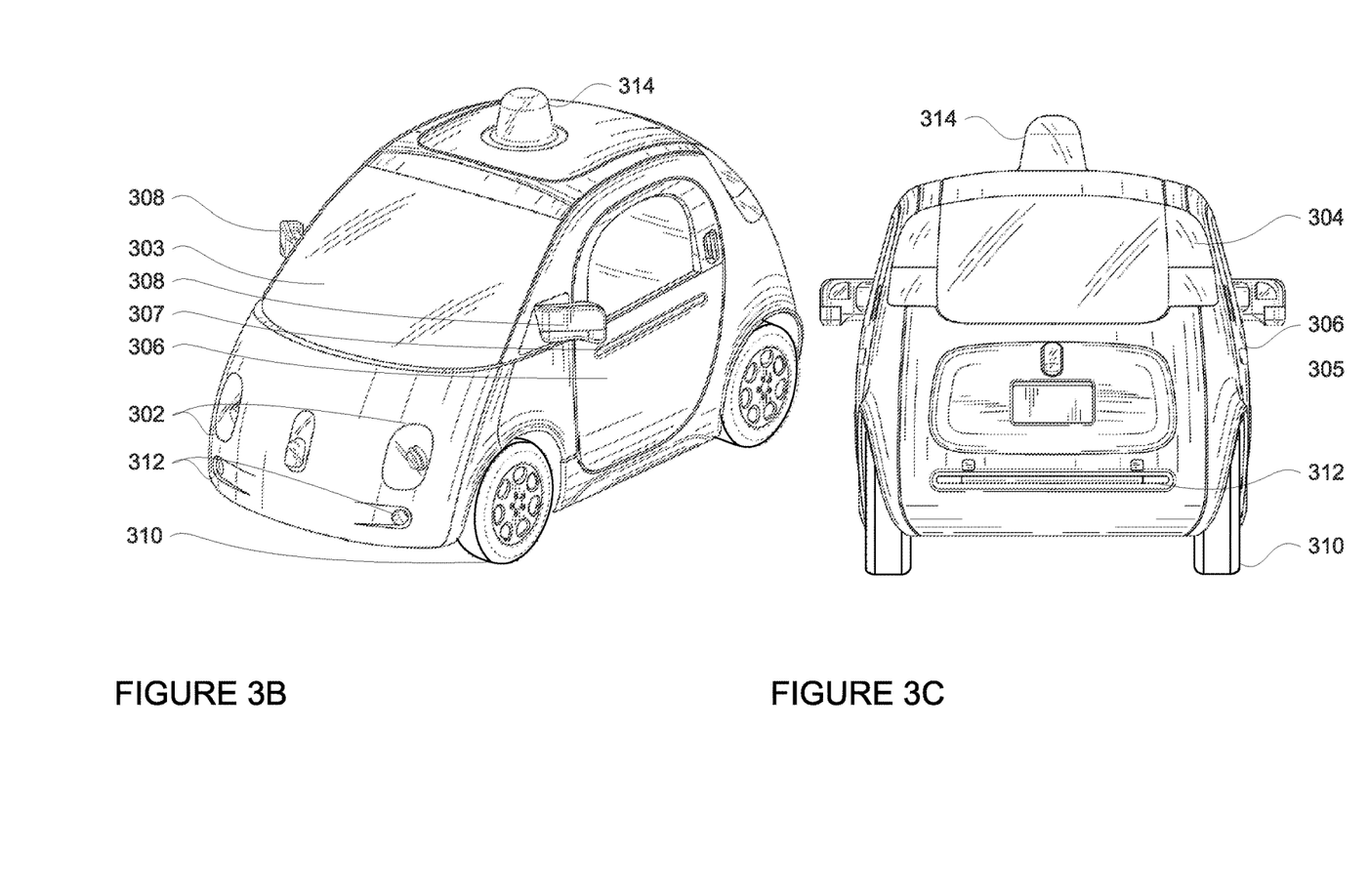
Figure 3D:
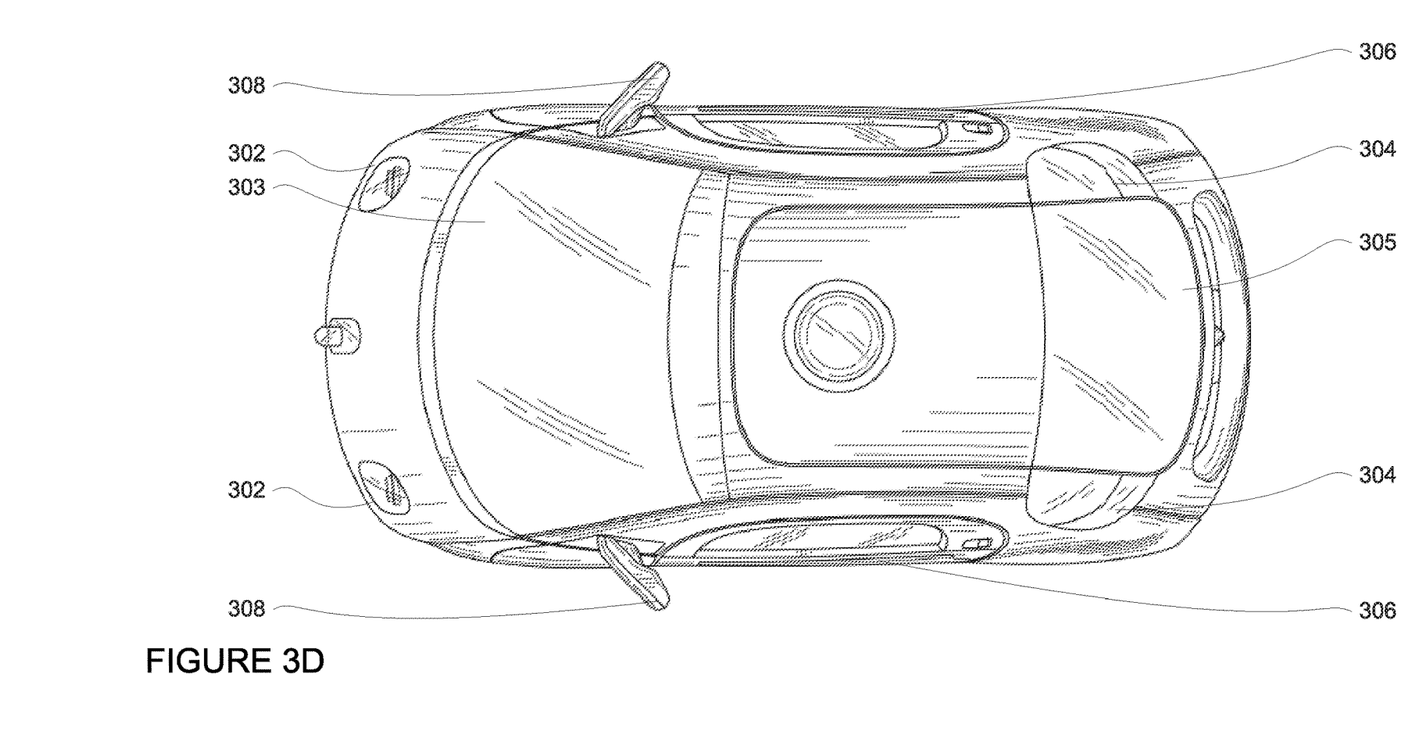

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways FIG. 2 is an example of map information 200 for a section of roadway. The map information 200 includes information identifying the shape, location, and other characteristics of various road features. In this example, the map information includes three lanes 212, 214, 216 bounded by curb 220, lane lines 222, 224, 226, and curb 228. Lanes 212 and 214 have the same direction of traffic flow (in an eastward direction), while lane 216 has a different traffic flow (in a westward direction). In addition, lane 212 is significantly wider than lane 214, for instance to allow for vehicles to park adjacent to curb 220. Although the example of map information includes only a few road features, for instance, curbs, lane lines, and lanes, given the nature of the roadway, the map information 200 may also identify various other road features such as traffic signal lights, crosswalks, sidewalks, stop signs, yield signs, speed limit signs, road signs, etc. Although not shown, the detailed map information may also include information identifying speed limits and other legal traffic requirements as well as historical information identifying typical and historical traffic conditions at various dates and times.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record sensor data which may be processed by computing devices 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent as sensor data for further processing to the computing devices 110 periodically and continuously as it is generated by the perception system 172. As discussed in further detail below, computing devices 110 may use the positioning system 170 to determine the vehicle's location and perception system 172 to detect and respond to objects when needed to reach the location safely.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166. Housing 314 may house one or more sensors, such as LIDAR sensors, sonar devices, radar units, cameras, etc. of the perception system 172, though such sensors may also be incorporated into other areas of the vehicle as well.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Computing devices 110 may maneuver vehicle 100 to a destination location, for instance, to transport cargo and/or one or more passengers. In this regard, computing devices 110 may initiate the necessary systems to control the vehicle autonomously along a route to the destination location. For instance, the navigation system 168 may use the map information of data 134 to determine a path or route to the destination location using the map information 200. The computing devices 110 may then maneuver the vehicle autonomously (or in an autonomous driving mode) as described above along the route towards the destination.

Figure 4:
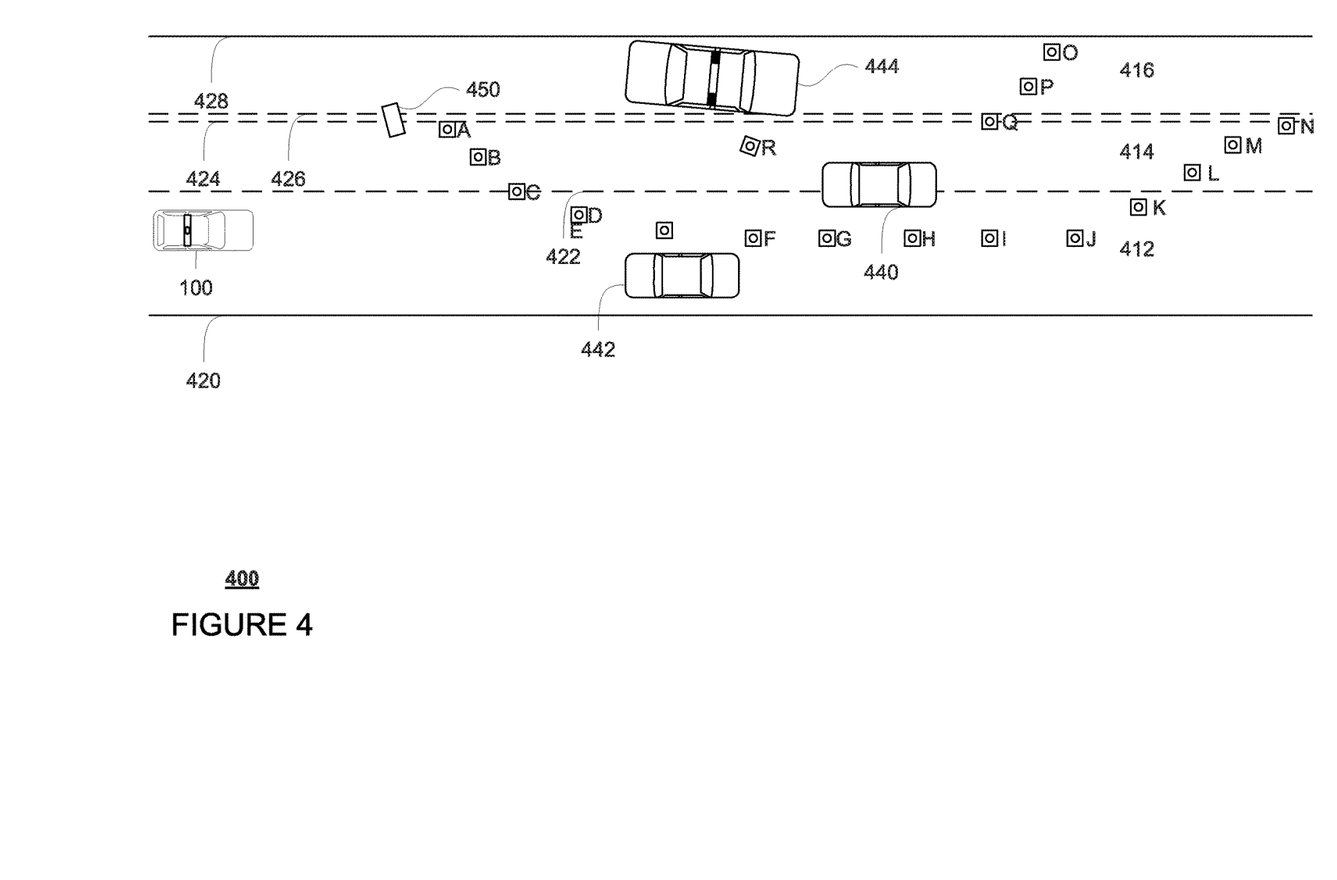
FIG. 4 is a view of a section of roadway in accordance with aspects of the disclosure.

FIG. 4 is an example view of vehicle 100 driving along a roadway 400 corresponding map information 200 of FIG. 2. In that regard, lanes 412, 414, 416 correspond to the shape and location of lanes 212, 214, 216, curbs 420, 428 correspond to the shape and location of curb 220, and lane lines 422, 424, 426 correspond to the shape and location of lane lines 222, 224, 226, and curb 228. In this example, vehicle 100 is traveling in lane 412.

Figure 5:
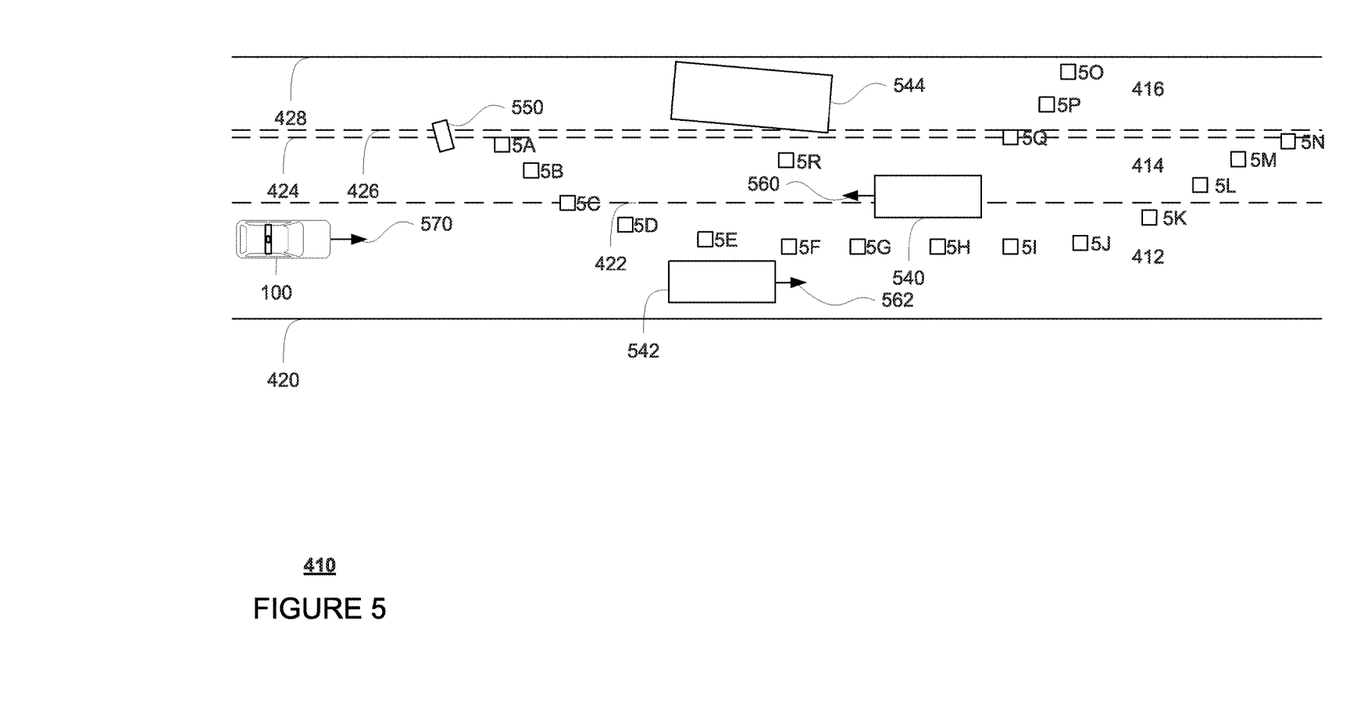
FIG. 5 is a view of a section of roadway and sensor data in accordance with aspects of the disclosure.

As the vehicle moves along lane 412, the perception system 172 provides the computing devices with sensor data regarding the shapes and location of objects, such as curbs 420, 428, lane lines 422, 424, 424, a sign 450, as well as traffic cones A-R. FIG. 5 depicts sensor data perceived by the various sensors of the perception system 172 when vehicle 100 is in the situation as depicted in FIG. 4 in combination with other information available to the computing devices 110. In this example, vehicles 440, 442, 444 are represented by bounding boxes 540, 542, 544 as provided by the perception system 172 to the computing devices 110, traffic cones A-R are represented by bounding boxes 5A-7R, and sign 450 is represented by bounding box 550. Of course, these bounding boxes represent merely a volume of space within which data points corresponding to an object are at least approximately bounded within. In addition, the actual heading of vehicle 100 and estimated heading of bounding boxes 540 and 542 are represented by arrows 570, 560, and 562, respectively. As bounding boxes 544 appears to be moving very slowly or not at all, the computing devices 110 may determine that the object represented by this bounding box is stationary adjacent curb 428.

As noted above, the vehicle 100 may attempt to group or cluster objects together. In order to do so, the computing devices 110 must make estimations about the similarity of objects and determine which objects can be logically clustered together. For instance, given a set of objects detected by the perception system 172 as well as the characteristics of those objects and changes in those characteristics over time, the computing devices may define a similarity measure or score between pairs of objects.

This set of objects may include any objects which are not already associated with a corresponding feature in the map information. For instance, lane lines, curbs, buildings, etc. may be ignored. However, objects such pedestrians, other vehicles, and bicyclists, construction objects (such as signs, barriers, traffic cones, etc.), debris, etc. may be included in the set of objects. For instance, returning to FIG. 4, the set of objects may include all or some of sign 450 (represented by bounding box 550, traffic cones A-R (represented by bounding boxes 5A-5R), as well as vehicles 440-444 (represented by bounding boxes 540-544).

Each of the objects in the set may be paired with each of the other objects in the set. For instance, static objects may be paired with other static objects (such as traffic cones, signs, debris, parked vehicles, etc.). Similarly, moving objects may be paired with other moving objects. Alternatively, each object may be paired with all other objects, or other types of pairings may be used. In this regard, sign 450 may be paired with each of traffic cones A-R and each of vehicles 440-444. Similarly, traffic cone A may be paired with sign 450, each of traffic cones B-R, and vehicles 440-444.

For each of these pairings, a similarity measure may be determined. The similarity score may be determined based on information provided to the computing devices 110 by the perception system 172, such as for a given object, the object's location, orientation, heading, and object type (pedestrian, bicyclist, vehicle, traffic cone, traffic sign etc.), and any changes in this information determined by the perception system overtime.

This similarity measure or value for a given pair of objects may consider a plurality of different factors, including, for instance, one or more of the following factors:

The distance between the objects. This value may be inverted and normalized to [0, 1], where 0 indicates the objects are very distant (ex. >10 m apart) and 1 indicates they are very close (ex. within a meter)).

The similarity between object type distributions. This value may suggest how similar different object types are. For instance a parking cone may be more similar to a traffic sign than a pedestrian, and a vehicle may be more similar to a bicyclist than a traffic cone. This value may be normalized to [0, 1], where 1 indicates an exact object type match, and 0 indicates mutually exclusive object categories.

The similarity in recent, current, and predicted future motion. This value may be a dynamic time warping or edit-distance based trajectory similarity measure which provide values that are easily normalized to the [0, 1] scale, wherein 1 indicates high similarity of recent, current, and predicted future motion, and 0 indicates no similarity of recent, current, and predicted future motion. These values may be a single combined value, taking into consideration one or more of the recent, current, or predicted future motion, or individual values for each of the recent, current, and predicted future motion.

The location of the objects relative to features in the environment. These other features may include static features included in the map information, such as crosswalks or bicycle lane. For instance, this factor may consider whether the objects are both in or within a predetermined distance (such as 2 feet or more or less) of a crosswalk, or whether the objects both in or within a predetermined distance (such as 2 feet or more or less) of a bicycle lane. This value may be normalized to [0, 1], where 1 indicates that both objects are in or within the predetermined distance of the same feature, and 0 indicates that both objects are not in or within the predetermined distance of the same feature.

The similarity of an "associated feature" vector for each of the objects. In this regard, a feature vector would be defined for each of the objects indicating a distance from the object to a particular feature of the map information, such as, for instance, a crosswalk, bike lane, road edge, etc. A similarity score may be determined based on the edit distance between the two feature vectors. In this example, 0 would indicate no match between the feature vectors, and 1 would indicate a total match between the feature vectors.

The observed relationships between objects. This value may indicate whether one of the given pair of objects appears to be following the other. Different semantic relationships may be assigned weights on the [0, 1] scale, where 1 indicates that one of the given pair of objects appears to be following the other, and 0 indicates that neither object appears to be following the other.

Whether the objects belong to the same special semantic group as detected by any scene understanding modules of the computing devices 110. For instance, whether both objects to a funeral procession as provided by a funeral procession detector, whether both objects are traffic cones as provided by a traffic cone detector, whether both objects are parked vehicles as provided by a parked vehicle detected, etc.

Although each of the foregoing are described as being normalized on a scale of [0, 1], other different scales and values may be used, and, in some instances, the values need not actually be normalized to the scale or at all.

Each of the aforementioned factors may increase or decrease the similarity measure between a given pair of objects. For instance, the values for each factor may be combined in order to determine the similarity measure for the given pair of objects. As one example, the overall score may be computed as a weighted linear sum of each factor. The weights for each of the factors may be tuned by a human operator and/or learned using machine learning tools. In some instances, the similarity measure can also be normalized to the [0, 1] scale, where 1 indicates high similarity, and 0 indicates no similarity.

When a similarity measure between a pair of objects meets a predetermined threshold, the objects may be clustered together. The thresholds used may be based on the precision and recall of the semantic clustering. The association between the similarity score and the true likelihood that the objects continue to move in the same way in the future can be assessed, for instance through human labeling or by examining what happens in the data after the point where the scores are determined. From this relationship, the computing devices can choose the operating points or thresholds that define a given precision versus recall tradeoff. A high recall or lower threshold value may be chosen initially to do clustering. However, if there are other computing resources available, higher precision or higher threshold values may also be explored.

Returning to the examples of FIGS. 4 and 5, traffic cones A and B and B and C may have very high similarity measures, or similarity measures closer to 1, such as 0.95, (if normalized on the [0, 1] scale). This may be because of the distances between each of traffic cones A and B as well as B and C, the fact that all of these parking cones are stationary, and because each of these objects corresponds to the same object type. If the threshold is 0.8, then traffic cones A and B may be identified as one cluster, and traffic cones B and C may be identified as another cluster.

As another example, vehicles 440 and 442 may have a lower similarity measure, or a similarity measure closer to 0, such as 0.15 (if normalized on the [0, 1] scale). This may be because while both vehicles are of the same object type and close to one another, they are moving in opposite directions and not following one another. As such if the threshold is 0.8, then these vehicles would not be clustered together.

As an alternative, paired objects may be clustered together using a sequential (non-iterative) approach. In this regard, in order to cluster a pair of objects, the pair of objects must satisfy a sequence or series of necessary conditions corresponding to the factors described above. Following the sequence of the series, a similarity measure or value may be generated for each factor. Each given similarity measure may then be compared to a corresponding threshold similarity value for the factor of the given similarity measure.

For instance, referring to the distance factor discussed above, a similarity measure may be determined for the distance between the objects of a pair of objects. For instance, if two objects are 5 meters apart, this may be converted to a value on the scale of [0, 1], where 0 indicates the objects are very distant (ex. >10 m apart) and 1 indicates they are very close (ex. within a meter). In this instance, the similarity measure for the distance factor may be 0.8. This may be compared to a corresponding threshold value for the distance factor, for instance 0.5. Since 0.8 is greater than 0.5, the objects of this pair meet the corresponding threshold value for the distance factor. Similar analysis may be made for each of the other factors described above.

If the similarity measure meets the corresponding threshold, another similarity measure is determined for the next factor in the series and is compared to the corresponding threshold similarity value for that factor. This continues until a similarity measure for a given factor does not meet the corresponding threshold similarity value for that given factor or until it is determined that the pair of objects meets all of the corresponding thresholds for all of the factors in the series. If the pair of objects meets all of the corresponding threshold similarity values for all of the factors in the series, the pair of objects may be clustered together. If not, the pair of objects may not be clustered together (at least at this point in time as discussed further below).

For instance, as a first factor in the series, a pair of objects must be sufficiently similar in type, for instance meeting a threshold value for type. If not, the objects would not be clustered. If so, the next factor in the series may be considered. For instance, the next factor may be that the objects of the pair must be sufficiently close to one another in distance, for instance, meeting a threshold value for distance. If not, the objects would not be clustered. If so, the objects must be sufficiently similar in motion, for instance meeting a threshold similarity value for motion. If not, the objects would not be clustered. If so, the process would continue through each of the factors and using corresponding threshold values to determine whether the objects should be clustered.

Clusters may be "merged" if they include common objects. In this regard, a union-find algorithm may be used to achieve this additional clustering and merging. For instance the cluster of traffic cones A and B may be merged with the cluster of traffic cones B and C, thus resulting in a cluster including traffic cones A, B, and C.

Figure 6:
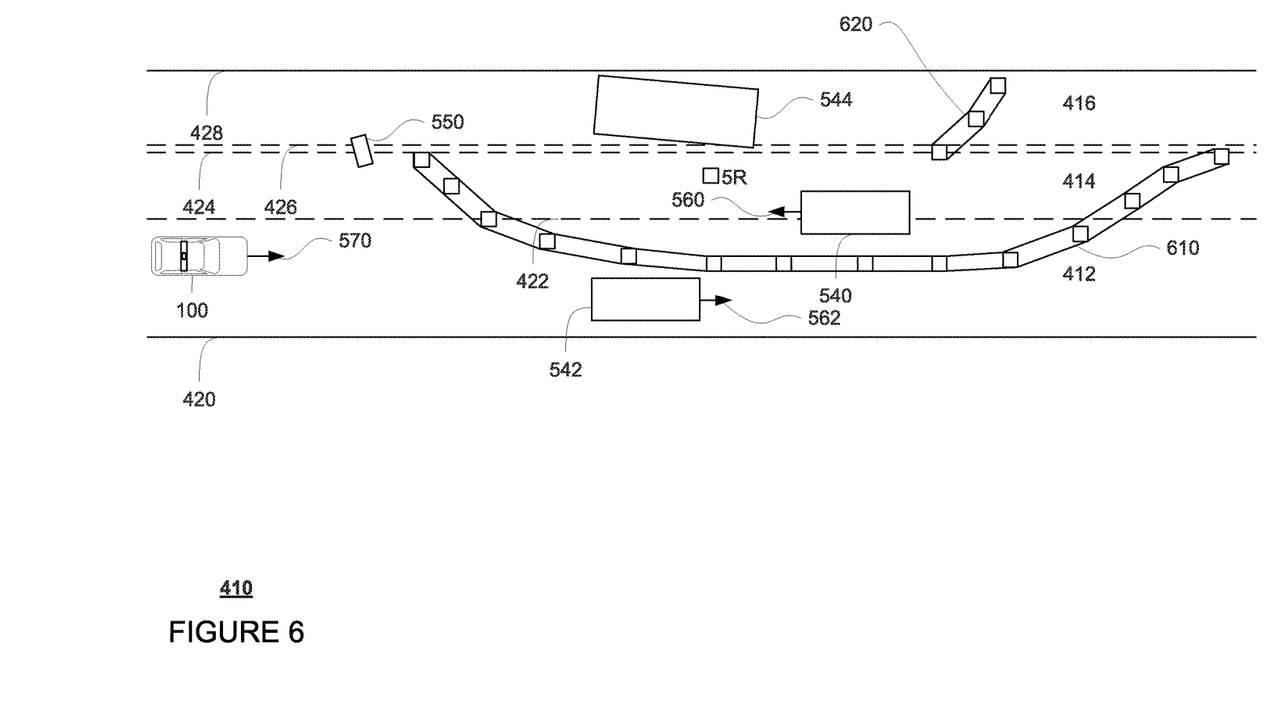
FIG. 6 is a view of a section of roadway and sensor data in accordance with aspects of the disclosure.

Once all possible merges have been completed, the resulting clusters of objects may be readily identified by the computing devices 110 as distinct clusters. For instance, as shown in FIG. 6, traffic cones A-N are identified as a cluster 610 and traffic cones Q-0 are identified as a cluster 620. Traffic cone R (presented by bounding box 5R) is not included in any cluster.

The computing devices 110 may then use the clusters to determine how to maneuver through the vehicle's environment, and in addition, can help to enforce that the vehicle's reaction for each object in a cluster is the same. In other words, the vehicle's computing devices may determine how to maneuver through the environment by presupposing that the clustered objects are a single object. For instance, the objects of each of clusters 610 and 620 may be treated as a single object, such that the vehicle 100 would be driven around them, and not between them.

Figure 7:
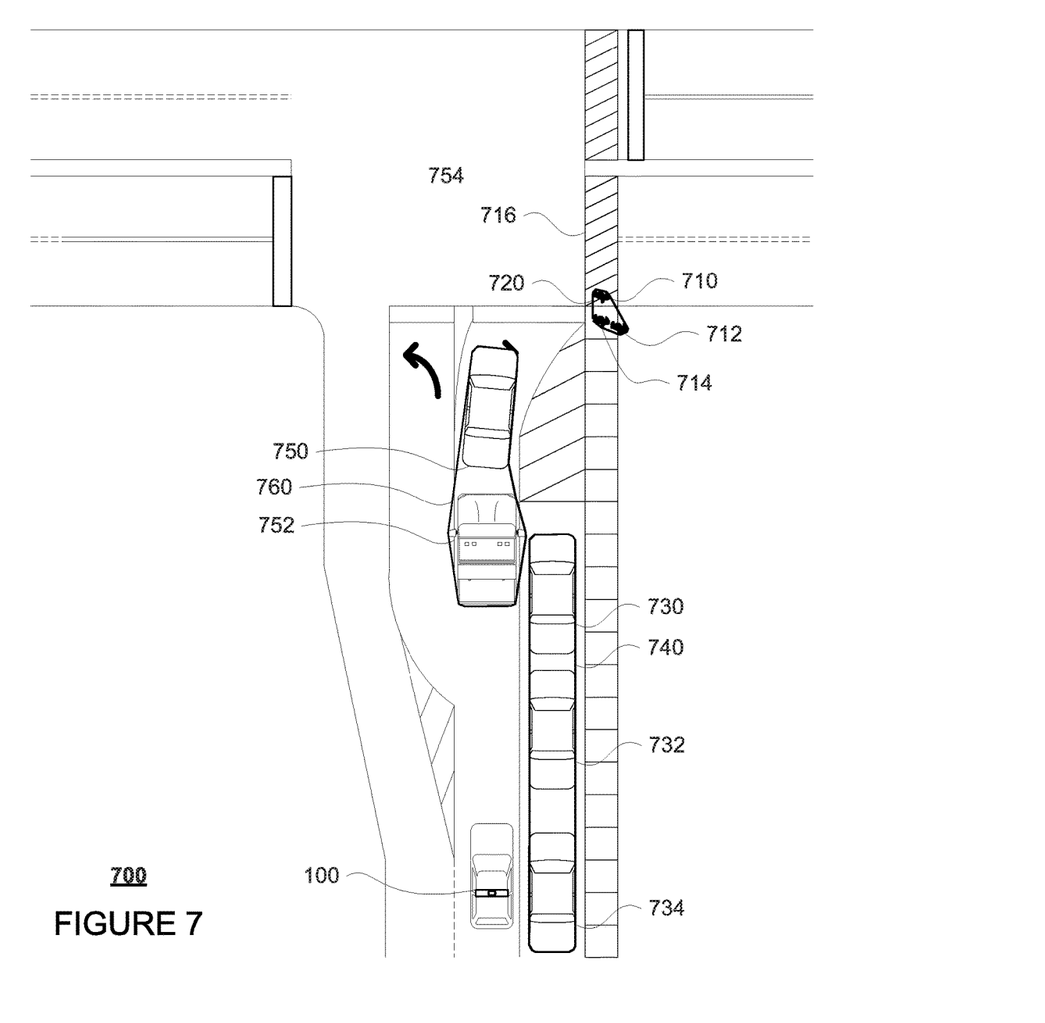
FIG. 7 is a view of a section of roadway and sensor data in accordance with aspects of the disclosure.

Although the examples of FIGS. 4-6 relate to clustering static objects, other objects, such as pedestrians, bicyclists, vehicles, etc. may also be clustered. As an example, FIG. 7 depicts another example of vehicle 100 driving on a roadway 700. This example demonstrates various other types of clusters. As shown, a plurality of pedestrians 710-714 proximate to a crosswalk 716 are identified as a cluster 720, a plurality of parked vehicles 730-734 are identified as a cluster 740, and a pair of "stacked vehicles" 750, 752 (for instance, vehicles waiting to turn at intersection 754) are identified as a cluster 760. Each of these clusters may be identified using the similarity measure or sequential approaches described above.

In addition, although the examples above relate to clustering objects of the same or similar types, objects of different types, such as vehicle 444 and traffic cone R (shown in FIG. 4) may also be clustered together depending upon the outcome of the similarity measure or sequential approaches described above.

In some instances, how the vehicle should maneuver through its environment can be determined first by using the clusters and subsequently without using the clusters. This may allow the vehicle's computing devices to explore reactions that violate the clustering, but such these will be prioritized after the set of reactions that obey the clustering. In other words, vehicle's computing devices may consider several different alternatives and, in some cases, may actually provide information about when clustering would actually be inappropriate or dangerous. Of course, this may require additional time and computing resources to process the situation twice and may not always be appropriate or helpful.

The clustering can be re-evaluated each time there is a new observation of any of the objects of the set. In this regard, objects can be clustered and severed from one another quickly. However, to allow for consistent vehicle behaviors and simplify the processing of the situation, when selecting between two reactions where it is not clear which is better, a prior determination based on whether the object was clustered with another object can be used to select between the reactions. For instance, when it is not clear whether to pass to the right or pass to the left of an object, but when the object was previously included in a cluster, the determined reaction was to pass to the left of the cluster, this previous determination may be used to give preference to passing to the left of the object (though now not included in the cluster). Typically this would only carry over from one iteration to the next, but if the same behavior is determined again, it would carry over again, etc.

In addition to cutting down the required number of reactions to evaluate and thereby cutting down on unnecessary computation, this approach offer additional benefits. For instance, the approach provides a framework for reacting to semantic classes of object clusters such as accompanied children, funeral processions, etc. The approach also provides a tool for addressing object segmentation issues coming from an onboard perception system. Segmentation, or differentiating between two perceived objects, is seldom perfect because perception engineers generally must tune between under segmentation (sometimes thinking that two distinct but nearby objects are the same) and over segmentation (thinking that one object is instead two distinct nearby objects). In the latter case, these objects to end up in the same semantic cluster and the vehicle's computing devices would generate the same trajectory as if segmentation were in fact perfect.

Figure 8:
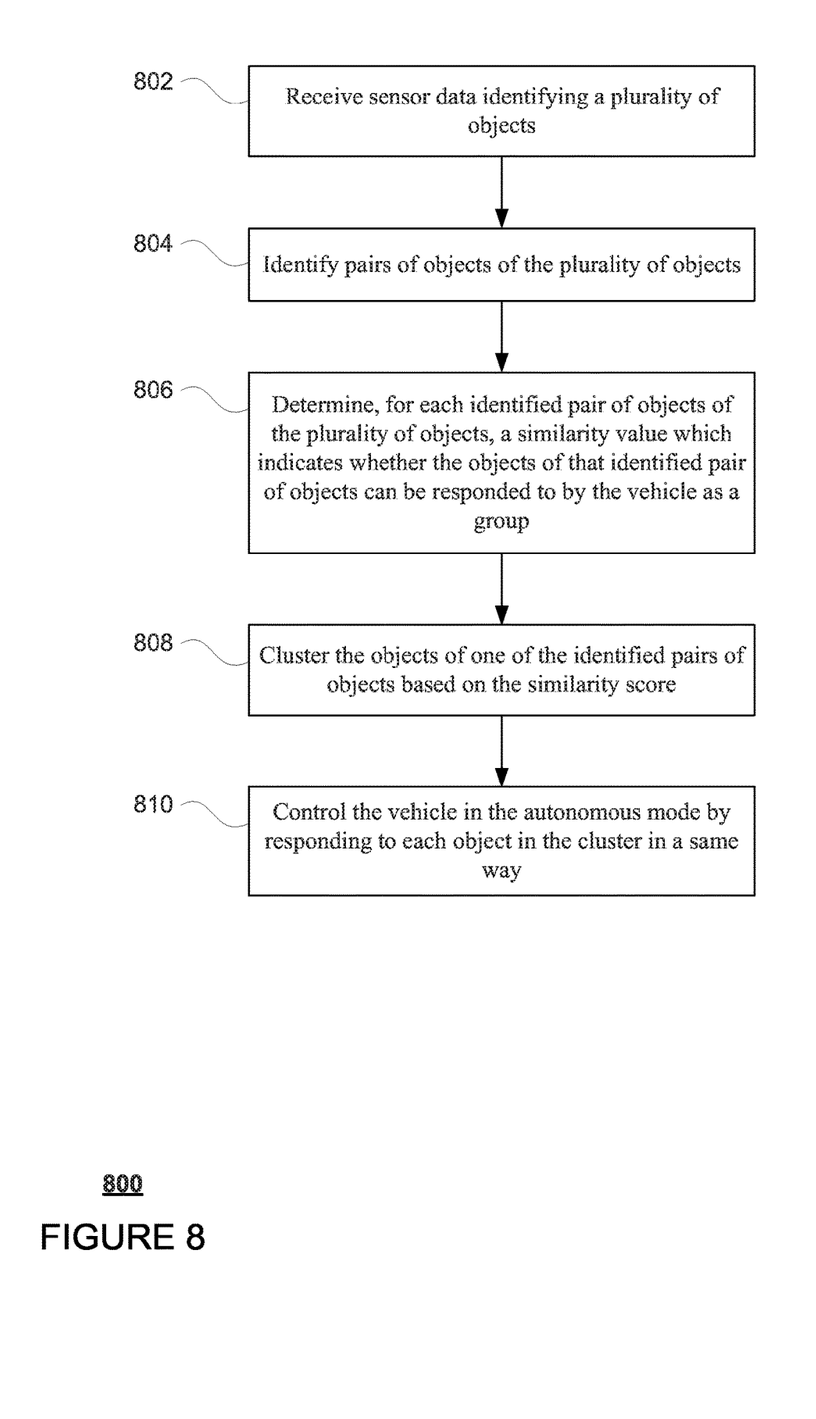
FIG. 8 is a flow diagram in accordance with aspects of the disclosure.

FIG. 8 is a flow diagram 800 that may be performed by one or more processors, such as one or more processors 120 of computing devices 110 in order to control a vehicle in an autonomous driving mode. In this example, at block 802 sensor data identifying a plurality of objects is received. At block 804, pairs of objects of the plurality of objects are identified. At block 806, for each identified pair of objects of the plurality of objects, a similarity value which indicates whether the objects of that identified pair of objects can be responded to by the vehicle as a group. At block 808, the objects of one of the identified pairs of objects are clustered based on the similarity value. At block 810, the vehicle is controlled in the autonomous mode by responding to each object in the cluster in a same way.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only

The invention claimed is:

1. A method of controlling a vehicle in an autonomous driving mode, the method comprising:
   receiving, by one or more processors, sensor data identifying a plurality of objects;
   identifying pairs of objects of the plurality of objects;
   determining, by the one or more processors, for each identified pair of objects of the plurality of objects, a similarity value which indicates whether the objects of that identified pair of objects can be responded to by the vehicle a group;
   clustering, by the one or more processors, the objects of one of the identified pairs of objects based on the similarity score; and
   controlling, by the one or more processors, the vehicle in the autonomous driving mode by responding to each object in the cluster in a same way.

2. The method of claim 1, wherein the clustering is further based on a distance between the objects of the one of the identified pairs of objects.

3. The method of claim 1, wherein the clustering is further based on a similarity between object types of the objects of the one of the identified pairs of objects.

4. The method of claim 1, wherein the clustering is further based on a similarity between past and current motion of the objects of the one of the identified pairs of objects.

5. The method of claim 1, wherein the similarity values are determined further based on a similarity between predicted future motion of the objects of the one of the identified pairs of objects.

6. The method of claim 1, wherein the clustering is further based on a relative location of the objects of the one of the identified pairs of objects to a feature in the environment.

7. The method of claim 6, wherein the feature is a crosswalk.

8. The method of claim 6, wherein the feature is a bicycle lane.

9. The method of claim 1, wherein the clustering is further based on whether one object of each identified pair of objects appears to be following another object of that identified pair of objects.

10. The method of claim 1, wherein the clustering is further based on whether the objects of each identified pair of objects are identified as belonging to a predetermined semantic group.

11. A system for controlling a vehicle in an autonomous driving mode, the system comprising one or more processors configured to:
   receive sensor data identifying a plurality of objects;
   identify pairs of objects of the plurality of objects;
   determine, for each identified pair of objects of the plurality of objects, a similarity value which indicates whether the objects of that identified pair of objects can be responded to by the vehicle as a group;
   cluster the objects of one of the identified pairs of objects based on the similarity score; and
   control the vehicle in the autonomous driving mode by responding to each object in the cluster in a same way.

12. The system of claim 11, wherein the one or more processors are further configured to cluster the objects of the one of the identified pairs of objects further based on a distance between the objects of the one of the identified pairs of objects.

13. The system of claim 11, wherein the one or more processors are further configured to cluster the objects of the one of the identified pairs of objects based on a similarity between object types of the objects of the one of the identified pairs of objects.

14. The system of claim 11, wherein the one or more processors are further configured to cluster the objects of the one of the identified pair of objects further based on a similarity between past and current motion of the objects of each identified pair of objects.

15. The system of claim 11, wherein the one or more processors are further configured to cluster the objects of the one of the identified pair of objects further based on a similarity between predicted future motion of the objects of the one of the identified pairs of objects.

16. The system of claim 11, wherein the one or more processors are further configured to cluster the objects of the one of the identified pair of objects further based on a relative location of the objects of the one of the identified pairs of objects to a feature in the environment.

17. The system of claim 16, wherein the feature is a crosswalk.

18. The system of claim 11, wherein the one or more processors are further configured to cluster the objects of the one of the identified pair of objects further based on whether one object of the objects of the one of the identified pairs of objects appears to be following another object of the objects of the one of the identified pairs of objects.

19. The system of claim 11, wherein the one or more processors are further configured to cluster the objects of the one of the identified pair of objects further based on whether the objects of the one of the identified pair of objects are identified as belonging to a predetermined semantic group.

20. The system of claim 11, further comprising the vehicle.

* * * * *

UNITED STATES PATENT AND TRADEMARK OFFICE
CERTIFICATE OF CORRECTION

PATENT NO. : 10,401,862 B2
APPLICATION NO. : 15/798926
DATED : September 3, 2019
INVENTOR(S) : Jared Stephen Russell and Fang Da Page 1 of 1

It is certified that error appears in the above-identified patent and that said Letters Patent is hereby corrected as shown below:

In the Claims

Claim 6
Column 13, Line 36 now reads "feature in the environment."; should read -- feature in an environment. --

Claim 16
Column 14, Line 35 now reads "feature in the environment."; should read -- feature in an environment. --

Signed and Sealed this
Fifth Day of November, 2019

Andrei Iancu
*Director of the United States Patent and Trademark Office*